(12) United States Patent
Zhao et al.

(10) Patent No.: US 11,514,340 B2
(45) Date of Patent: Nov. 29, 2022

(54) MACHINE LEARNING FOR TECHNICAL TOOL SELECTION

(71) Applicant: International Business Machines Corporation, Armonk, NY (US)

(72) Inventors: Wen Rui Zhao, Beijing (CN); Yu Zhao, Beijing (CN); Li Ni Zhang, Beijing (CN); Lan Luo, Beijing (CN); Jing Bo Jiang, Beijing (CN); Li Long Chen, Beijing (CN); Li Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 16/678,564

(22) Filed: Nov. 8, 2019

(65) Prior Publication Data
US 2021/0142186 A1    May 13, 2021

(51) Int. Cl.
| | |
|---|---|
| *G06F 16/9535* | (2019.01) |
| *G06N 5/04* | (2006.01) |
| *G06F 16/9032* | (2019.01) |
| *G06N 20/00* | (2019.01) |

(52) U.S. Cl.
CPC ......... *G06N 5/04* (2013.01); *G06F 16/90332* (2019.01); *G06F 16/9535* (2019.01); *G06N 20/00* (2019.01)

(58) Field of Classification Search
CPC ........... G06F 16/90332; G06F 16/9535; G06F 16/3322; G06F 16/5838; G06F 40/284; G06F 8/20; G06F 9/451; G06N 5/04; G06N 20/00; G06Q 10/063112; G06Q 30/0244; H04N 1/0019
See application file for complete search history.

(56) References Cited

U.S. PATENT DOCUMENTS

| | | | |
|---|---|---|---|
| 7,774,090 B2 | 8/2010 | Baumgartner | |
| 7,801,759 B1 | 9/2010 | Adams et al. | |
| 8,706,748 B2 * | 4/2014 | Herlocker | G06F 16/3322 |
| | | | 707/765 |
| 9,928,239 B2 * | 3/2018 | Hickey | G06N 20/00 |
| 2003/0004968 A1 * | 1/2003 | Romer | G06F 16/5838 |
| | | | 707/E17.022 |
| 2010/0269087 A1 | 10/2010 | Kabra | |
| 2016/0328789 A1 * | 11/2016 | Grosz | H04N 1/0019 |

(Continued)

OTHER PUBLICATIONS

Mell et al., "The NIST Definition of Cloud Computing", NIST, Special Publication 800-145, Sep. 2011, pp. 1-7.

(Continued)

*Primary Examiner* — Le H Luu
(74) *Attorney, Agent, or Firm* — Scully, Scott, Murphy & Presser, P.C.; Michael A. Petrocelli (57) ABSTRACT

Methods and systems for selecting a tool for a project is described. In an example, a processor can run a machine learning model to generate a set of requirements to implement a project. The processor can identify a keyword from the set of requirements. The processor can search for the keyword on a search engine. The processor can receive a search result from the search engine corresponding to the keyword. The processor can identify, based on the search result, a tool that can be used to implement the project, where the tool can be in compliance with the set of requirements.

20 Claims, 5 Drawing Sheets

(56) References Cited

U.S. PATENT DOCUMENTS

| | | | |
|---|---|---|---|
| 2017/0132555 A1* | 5/2017 | Ritter | G06Q 10/063112 |
| 2017/0192778 A1* | 7/2017 | Srivastava | G06F 8/20 |
| 2019/0324886 A1* | 10/2019 | Champlin-Scharff | G06F 9/451 |
| 2020/0034887 A1* | 1/2020 | Hamedi | G06Q 30/0244 |
| 2021/0042110 A1* | 2/2021 | Basyrov | G06F 40/284 |

OTHER PUBLICATIONS

Zeng et al., "Software Ranker: A New Comprehensive Software Ranking Approach", IEEE, Jul. 2018, pp. 126-130.

Ahmad et al., "Software Project Management Tools: Making a Practical Decision Using AHP", Proceedings of the 30th Annual IEEE/NASA Software Engineering Workshop SEW-30 (SEW'06), May 2006, pp. 1-7.

* cited by examiner

MACHINE LEARNING FOR TECHNICAL TOOL SELECTION

BACKGROUND

The present application relates generally to computers and computer applications, and more particularly to implementing machine learning models in technical tool selection for technical projects.

Technical tools, such as software programs and applications, can be utilized in various technical aspects of a technical project. These technical aspects can include programming, software development, testing, database creation and maintenance, website creation and maintenance, server setup and selection, network management, and/or other technical aspects of the technical project. One or more technical tools can be selected to handle these technical aspects of the technical project.

SUMMARY

In some examples, a system for selecting a tool for a project is generally described. The system can include a memory and a processor configured to be in communication with the memory. The processor can be configured to run a machine learning model to generate a set of requirements to implement a project. The processor can be further configured to identify a keyword from the set of requirements. The processor can be further configured to search for the keyword on a search engine. The processor can be further configured to receive a search result from the search engine corresponding to the keyword. The processor can be further configured to identify, based on the search result, a tool that can be used to implement the project, where the tool can be in compliance with the set of requirements In some examples, a method for selecting a tool for a project is generally described. The method can include running, by a processor, a machine learning model to generate a set of requirements to implement a project. The method can further include identifying, by the processor, a keyword from the set of requirements. The method can further include searching, by the processor, for the keyword on a search engine. The method can further include receiving, by the processor, a search result from the search engine corresponding to the keyword. The method can further include identifying, by the processor, based on the search result, a tool that can be used to implement the project, where the tool can be in compliance with the set of requirements.

In some examples, a computer program product for selecting a tool for a project is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In some examples, selection criteria of technical tools for a technical project can be arbitrary. The systems and methods to be described herein can provide evaluation of various technical tools and can select particular technical tools based on various attributes of a technical project. In an example, a system described in accordance with the present disclosure can train a machine learning model to learn the various attributes of different types of technical projects and corresponding contexts, run the machine learning model to generate a set of requirements for technical tools that can be used to implement the technical project, and identify one or more technical tools that may fulfill the set of requirements.

Figure 1:
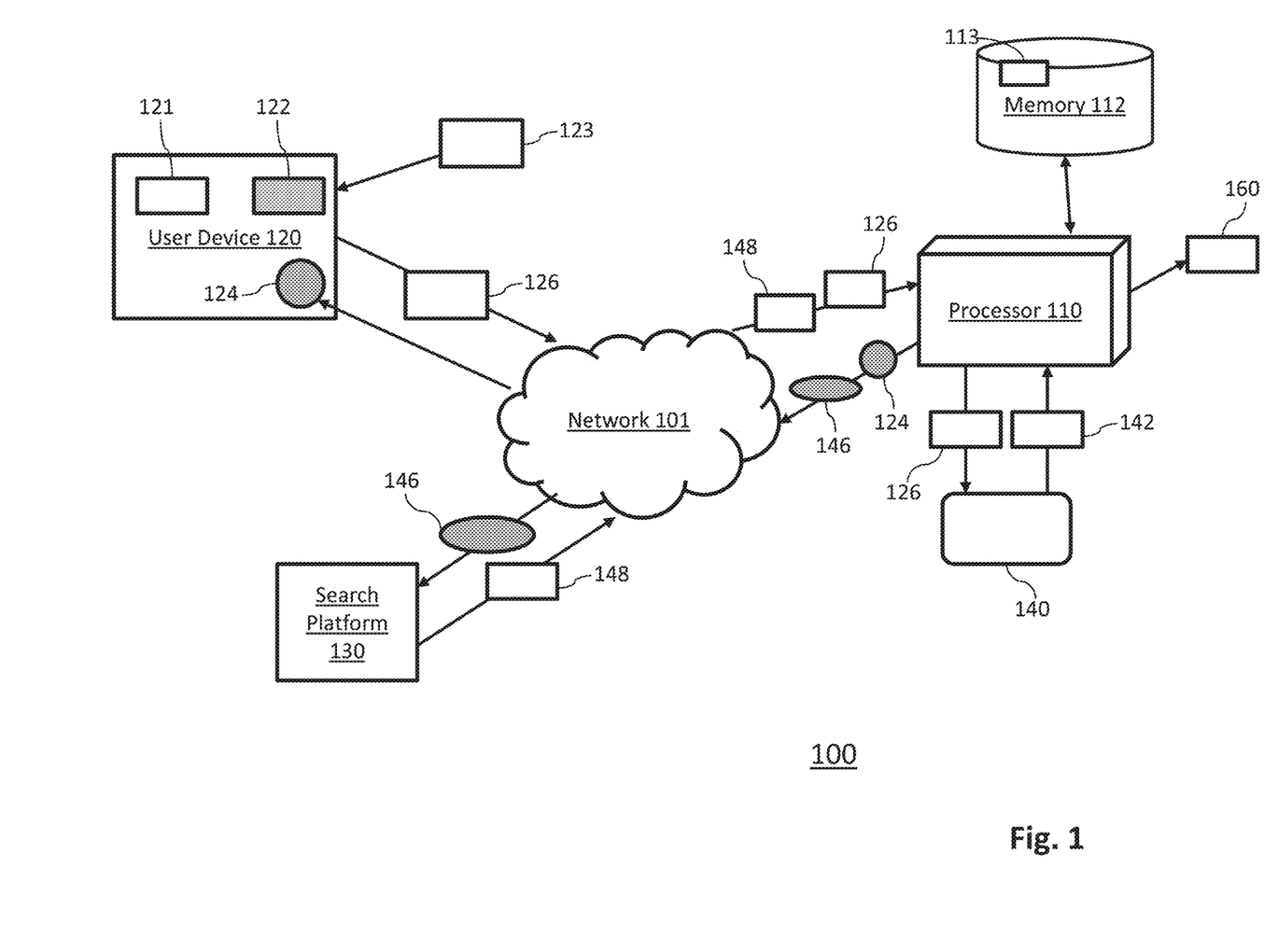
FIG. 1 is a diagram showing an example computer system that can implement machine learning for technical tool selection in one embodiment.

FIG. 1 is a diagram showing the example computer system 100 that can implement machine learning for technical tool selection in one embodiment. The system 100 can include a processor 110 and a memory 112 configured to be in communication with each other. In some examples, the processor 110 and the memory 112 can be components of a computer device such as a server, a desktop or laptop computer, and/or other types of computer devices. The memory 112 can be configured to store data and instructions that can be used by the processor 110 to implement the system 100. In some examples, the memory 112 can store instructions 113 that can be executed by the processor 110 to perform the methods described in accordance with the present disclosure. For example, the instructions 113 being stored in the memory 112 can include source code that can be compiled by the processor 110, object code resulting from compilation of source code, and/or executable code that can be run and loaded by the processor 110. In some examples, the processor 110 and the memory 112 can be components of a cloud computing platform. The processor 110 can be configured to be in communication with a user device 120 and a search platform 130 through a network 101. The network 101 can be the Internet. The search platform 130 can be a search engine. The user device 120 can be, for example, a device or computer configured to run a website, a mobile application, and/or other types of applications.

The system 100 can be implemented to select one or more technical tools, and generate an output 160 that may include indications of the selected one or more technical tools. The output 160 can include, for example, a recommended list of technical tools including the technical tools, access to the selected technical tools (e.g., web site, hyperlinks), instructions for using the selected technical tools, and/or other types of information relating to the selected technical tools. In some examples, the output 160 can be outputted on a display configured to be in communication with the processor 110 and/or the user device 120. For example, the recommended list of technical tools can be displayed in a user interface associated with a website or mobile application, such that a user of the user device 120 may view the output 160. In some examples, the output 160 can include instructions and data that can be pushed to the user device 120 by the processor 110. In an example embodiment, the pushed instructions and data can cause the user device 120 to autonomously run a browser application. For example, the user device 120, based on the instructions pushed by the processor 110, can open one or more browser windows or tabs to display one or more hyperlinks, websites, or instructions, associated with the recommended list of tools. In another example embodiment, the pushed instructions can cause the user device 120 to autonomously download one or more recommended tools from hyperlinks that may be included in the output 160.

The process to generate the output 160 can begin with the processor 110 generating and deploying an agent 124 to the user device 120. In an example, the processor 110 can generate the agent 124 by executing the instructions 113 stored in the memory 112. The agent 124 can be, for example, a software agent, a computer program, or a bot, that can be executable on a computing device such as the user device 120 and/or the processor 110. In some examples, the agent 124 can be embedded in an application 122 that can be executable on the user device 120. In some examples, the agent 124, when deployed to the user device 120, can be autonomous (e.g., no user input is needed to run the agent 124). For example, the agent 124 can be embedded as a portion of executable code the application 122, such that as the user device 120 runs the application 122, the user device 120 can also run the agent 124 autonomously or, in some examples, as a background application.

The agent 124, when being run by the user device 120, can be configured to extract data or information from ecosystem data 121 that may be stored in the user device 120. The agent can also be configured to extract data from a user input 123 that may be received at the user device 120 from a user. The ecosystem data 121 can include data indicating attributes or characteristics of a project (e.g., a target project) and the user device 120. For example, the ecosystem data 121 can include data indicating a type of the target project, a set of tasks needed to implement the target project, current tools being used to implement the target project, type of network being used to implement the target project, memory consumption, throughput level, amounts and locations of servers being used by the target project, architecture of the user device 120 being used to implement the target project, project languages, development framework, development pattern, project-specific characteristic (e.g., only use internal network), existing tools to integrate, development scale, cost of purchase (e.g., open source vs. paid), stable requirement, flexible requirement, security, concurrency levels and/or other current and known information relating to the target project and the user device 120. The user input 123 can indicate, for example, preferences, requirements, constraints, and/or additional comments from one or more users of the target project and the user device 120.

The agent 124 can desensitize the extracted information or data to generate context data 126, such that the context data 126 can be a desensitized version of the extracted data. For example, the agent 124 can extract a list of entities that may use the target project, and can apply various masking techniques to desensitize or encrypt the names of the entities. In another example, the agent can extract data indicating a number of managing network nodes of the target project, and desensitize the number by assigning a range of numbers that includes the number in generating the context data 126. Thus, the agent 124 can provide the function of securing data being provided by users of the user device 120 and data being stored in the user device 120. The agent 124 (or the user device 120) can send the context data 126 to the processor 110 through the network 101.

The processor 110 can receive the context data 126 from the user device 120. The processor 110 can run a machine learning model 140 ("model 140") using the context data 126 as an input to the model 140. The model 140 can be, for example, a classification model that can be run by the processor 110 to classify an input into an output including a set of requirements (described below). The model 140 can include one or more feature vectors, where a feature vector can represent an attribute of the target project or the user device 120. A feature vector can include a set of variables, and a variable can represent an element of the feature vector. For example, a feature vector can be programming languages, and the programming language feature vector can include a plurality of variables representing a plurality of different programming languages. The set of variables can be associated with a set of weights, where a weight can represent values representing, for example, advantage, disadvantage, efficiency, importance, need, usage frequency, and/or other types of properties of the elements among the feature vectors. For example, the programming language feature vector can be $X=\{x_1, x_2, \ldots, x_n\}$, where n is the total number of programming languages represented by the feature vector X. In another example, a feature vector representing a user amount (e.g., potential number of users that will be using the target project) can be $U=\{u_1, u_2, \ldots, u_k\}$, where k is the total number of possible ranges of user amount. For example, $u_1$ can be a range 0-1,000, $u_2$ can be a range 1,000-5,000, etc. In some examples, the model 140 can include feature vectors having variables corresponding to different tools (e.g., software programs), where weights of these tool variables can indicate advantages or disadvantages, or efficiency, in using these tools for different types of projects. In some examples, the model 140 can be a ranking model trained by applying one or more learning to rank (LTR) algorithms, and using training data that may include one or more lists of feature vectors, where some partial order can be specified between the feature vectors in each list among the one or more lists. LTR can be implemented as one or more supervised, semi-supervised, or reinforcement learning algorithms.

In some examples, the processor 110 can be configured to convert the context data 126 into a format that can be inputted into the model 140. For example, the processor 110 can generate an input $c_1x_1+c_2x_2$, where coefficients c1 and c2 can represent an input weight indicated by the ecosystem data 121 or the user input 123 for programming languages $x_1$ and $x_2$, respectively. In an example, the context data 126 can indicate that the target project uses the programming language $x_2$. Thus, the processor 110 can generate an input indicating a vector of $(0)x_1+(1)x_2=x_2$ for the model 140, where the coefficient $c_1=0$ indicates that the target project does not use the programming language represented by the element x1, and the coefficient $c_2=1$ indicates that the target project needs to use the programming language $x_2$. In another example, the processor 110 can generate an input $d_1u_1+d_2u_2$, where coefficients d1 and d2 can represent an input weight indicated by the ecosystem data 121 or the user input 123 for ranges of users $u_1$ and $u_2$, respectively. The context data 126, which can be desensitized, can indicate that the target project may have 1,000 to 3,000 users. Thus, the processor 110 can generate an input indicating a vector of $(0)u_1+(1)u_2=u_2$ for the model 140, where coefficient $d_1=0$ indicates that the user amount of target project does not fall within the range of 0-1,000, and the coefficient $d_2=1$ indicates that the user amount of the target project falls into the range of 1,000-5,000.

In another example, the context data can indicate preference for two different programming languages $x_1$ and $x_2$. The processor 110 can identify information from the context data 126 that may indicate additional information, such as a user preference, for either one or both of the programming languages $x_1$ and $x_2$. If no user preference is indicated by the context data 126, the processor 110 can generate an input indicating a vector of $x_1+x_2$ for the model 140, where both $x_1$ and $x_2$ has equal input weight of '1'. If the context data 126 indicates a user preference of $x_1$ over $x_2$, then the processor can generate an input indicating a vector of $c_1x_1+c_2x_2$ for the model 140 with $c_1$ being greater than $c_2$.

In another example, using the above example of programming language input, the model 140 can output either programming languages $x_1$ or $x_2$, if the user preference (in the above example) indicates equal coefficient for both $x_1$ and $x_2$, and the a trained weight of the element $x_1$ in the model 140 is greater than a trained weight of the element $x_2$ in the model 140, the model 140 can output $x_1$ among the set of requirements 142. Note that the trained weight of the element $x_1$ in the model 140 can be greater than the trained weight of the element $x_2$ in the model 140 based on historical data, such as data indicating that programming language $x_1$ is more effective than programming language $x_2$ for projects that are similar to the target project. In another example, if the user preference (in the above example) indicates a preference for $x_1$ over $x_2$, and a trained weight of the element $x_1$ in the model 140 is less than a trained weight of the element $x_2$ in the model 140, the model 140 can output $x_2$ among the set of requirements 142 to override the user preference. In some examples, the agent 124 can prompt a user of the user device 120 to enter one preferred attribute (e.g., programming language) instead of multiple preferred attribute, to avoid the processor 110 overriding the user preference. Other options to activate or deactivate the overriding of user preference can be implemented, such as by outputting a prompt to a user of the user device 120 to seek permission to override user preferences.

By running the model 140 using the context data 126, or input vectors converted from the context data 126, the model 140 can classify the target project into one or more requirements among a set of requirements 142. For example, the set of requirements 142 can include, for example, programming languages, data security requirements, database sizes, server amount and locations, memory consumption, processing power, and/or other requirements. The set of requirements 142 outputted by the model 140 can thus indicate particular project attributes that may be required to implement the target project. Using the above example of user amount of the target project, the model 140 can output a number, or a range of numbers, of servers that may be needed to accommodate the inputted amount of users. For example, the model 140 can output a requirement indicating that the target project requires 1,000-5,000 users (represented by $u_2$) and a programming language $x_1$.

The processor 110 can extract one or more keywords 146 from the set of requirements 142 outputted from the model 140. For example, a keyword can be a name of the particular programming language indicated by the set of requirements 142. In another example, the processor 110 can combine the extracted keywords to generate groups of keywords. For example, the set of requirements 142 outputted from the model 140 can include "programming language Y", "K servers" and "X users", and the processor 110 can combine portions (e.g., words) from the set of requirements 142 to generate a sting of keywords, such as "Programming Language Y for setting up K servers for X users". The processor 110 can perform a search for the one or more keywords 146, or groups of keywords, on the search platform 130. For example, the processor 110 can run a bot (that can be different from agent 124) to perform a search for keywords 146 on a search engine (e.g., search platform 130) on the Internet. The search platform 130 can return a search result 148 to the processor 110. The search result 148 can include one or more of a compilation of texts, symbols, numbers, web pages, hyperlinks, and/or other types of indications that can represent a list of technical tools.

The processor 110 can receive the search result 148 and perform various analysis on the search result 148 to identify one or more tools that can be used to generate the output 160. For example, the processor 110 can be configured to run one or more natural language processing (NLP) techniques or algorithms to analyze the search result 148 to identify one or more tools. The identified tools can be in compliance with the set of requirements 142 (e.g., satisfying the set of requirements 142). In an example, the search result 148 can include a positive feedback from a user that has used a particular tool for a project similar to the target project, and the processor 110 can run NLP algorithms to determine that the feedback was positive and the particular tool can be selected. Further, the results of the NLP algorithms can be used as training data to retrain the model 140. Using the example with the positive feedback, the processor 110 can retrain the model 140 to, for example, increase a weight associated with a feature vector representing an advantage of the particular tool in the model 140.

The processor 110 can generate the output 160, such as by compiling the identified tools and output the identified tools on a user interface that can be displayed by, for example, the application 122 on the user device 120. In another example, the processor 110 can select a portion of the identified tools and generate the output 160 with the selected tools, where the selection can be based on, for example, user preferences indicated in user input 123.

The processor 110 can be configured to train the model 140 using historical data and user data and preferences. The historical data can include, for example, historical context data received from one or more user devices, historical outputs (e.g., selected tools) from the system 100, historical sets of requirements outputted by the model 140, historical keywords identified from the historical sets of requirements, and historical search results of the historical keywords. The processor 110 can be further configured to continuously retrain the model 140. For example, the processor 120 can use the output 160 generated based on user input 123 and ecosystem data 121 as training data to retrain model 140. By continuously training the model 140 using outputs of the system 100, an accuracy of the processor 110 in identifying tools for different types of projects can be improved. The trained model 140 can optimize a technical tool selection process.

In an example, the target project can be a setup of a CICD (Continuous Integration Continuous Deployment) pipeline for an application. To setup CICD, a plurality of tools can be available, where each tool or software can have its own advantages and disadvantages. For example, CI (Continuous Integration) tools can include JENKINS, TRAVIS, TEAM-CITY, CIRCLE CI, BAMBOO, GITLAB CI, CODESHIP, and for implementing CD (Continuous Deployment) can include CHEF, ANSIBLE, SALT, etc. Other tools can be, for example, configuration management tools, physical server, virtual machines, container for deployment platform, etc. The ecosystem data 121 of the target project can indicate that the application has complex configuration and process, and most of the system context of the target project are using JAVA, and one of the tasks among the target project is already using the tool T1 to manage the servers configurations, which implies that a development team of the target project may have experience with the tool T1. Thus, the tool T1 can have a relatively high advantage compared to other tools. Further, the tool T2 can be known (or indicated by the model 140) as the most popular deployment tool, but due to the experience of the development team with T1, the processor 110 can override the indicate in the model 140 to output T1 instead of T2 among the set of requirements 142. In another example, with respect to the CI tools, as most of the system context of the target project may be using JAVA, and these contexts may have a significant numbers of library dependencies within the whole target project, the user input 123 can indicate a request to resolve as many dependencies as possible within a defined amount of build time. The processor 110 can input this defined amount of build time to the model 140 such that the model 140 can output requirements indicating JAVA and the defined amount of build time.

Figure 2:
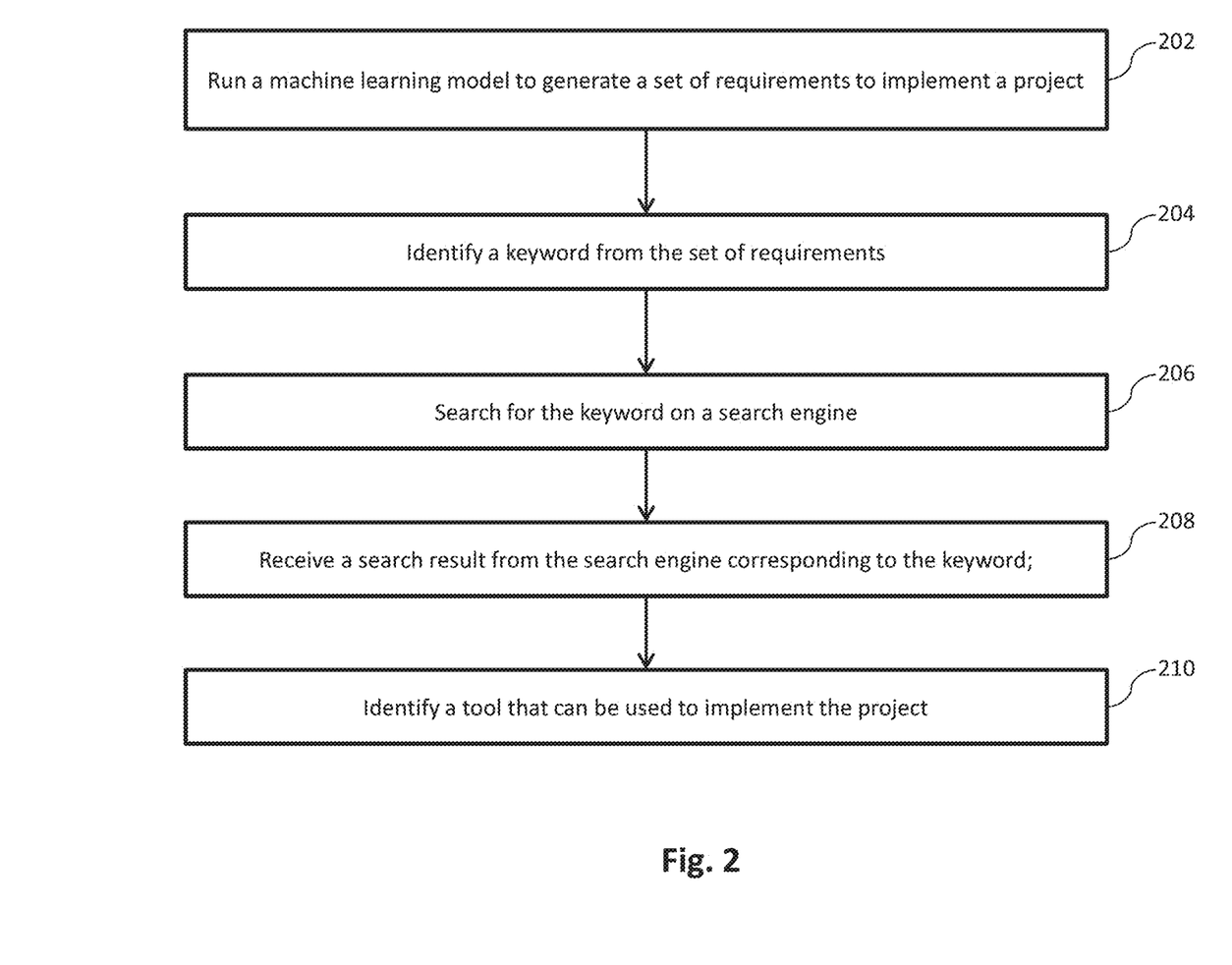
FIG. 2 is a flow diagram illustrating a process relating to machine learning for technical tool selection in one embodiment.

FIG. 2 is a flow diagram illustrating a process that can be performed by a processor to implement machine learning for technical tool selection in one embodiment. An example process may include one or more operations, actions, or functions as illustrated by one or more of blocks 202, 204, 206, 208, and/or 210. Although illustrated as discrete blocks, various blocks may be divided into additional blocks, combined into fewer blocks, eliminated, or performed in parallel, depending on the desired implementation. The description of the flow diagram of FIG. 2 may reference at least some of the components of FIG. 1.

The process (of FIG. 2) can begin at block 202, where a processor can run a machine learning model to generate a set of requirements to implement a project. In some examples, the processor can deploy an agent to a user device prior to running the machine learning model. The processor can receive, from the agent, context data representing a context of the project and the user device. The processor can run the machine learning model with the context data. In some examples, the context data can be desensitized, and may at least one user preference. In some examples, the processor can train the machine learning model using historical data.

The process can continue from block 202 to block 204. At block 204, the processor can identify a keyword from the set of requirements. The process can continue from block 204 to block 206. At block 206, the processor can search for the keyword on a search engine. The process can continue from block 206 to block 208. At block 208, the processor can receive a search result from the search engine corresponding to the keyword.

The process can continue from block 208 to block 210. At block 210, the processor can identify a tool that can be used to implement the project. The identification of the tool can be based on the search result, and the tool can be in compliance with the set of requirements. In some examples, the processor can identify the tool from the search result by executing natural language processing (NLP) techniques on the search result. In some examples, the processor can retrain the machine learning model using at least one of the set of requirements, the keyword, the search result, and the identified tool.

Figure 3:
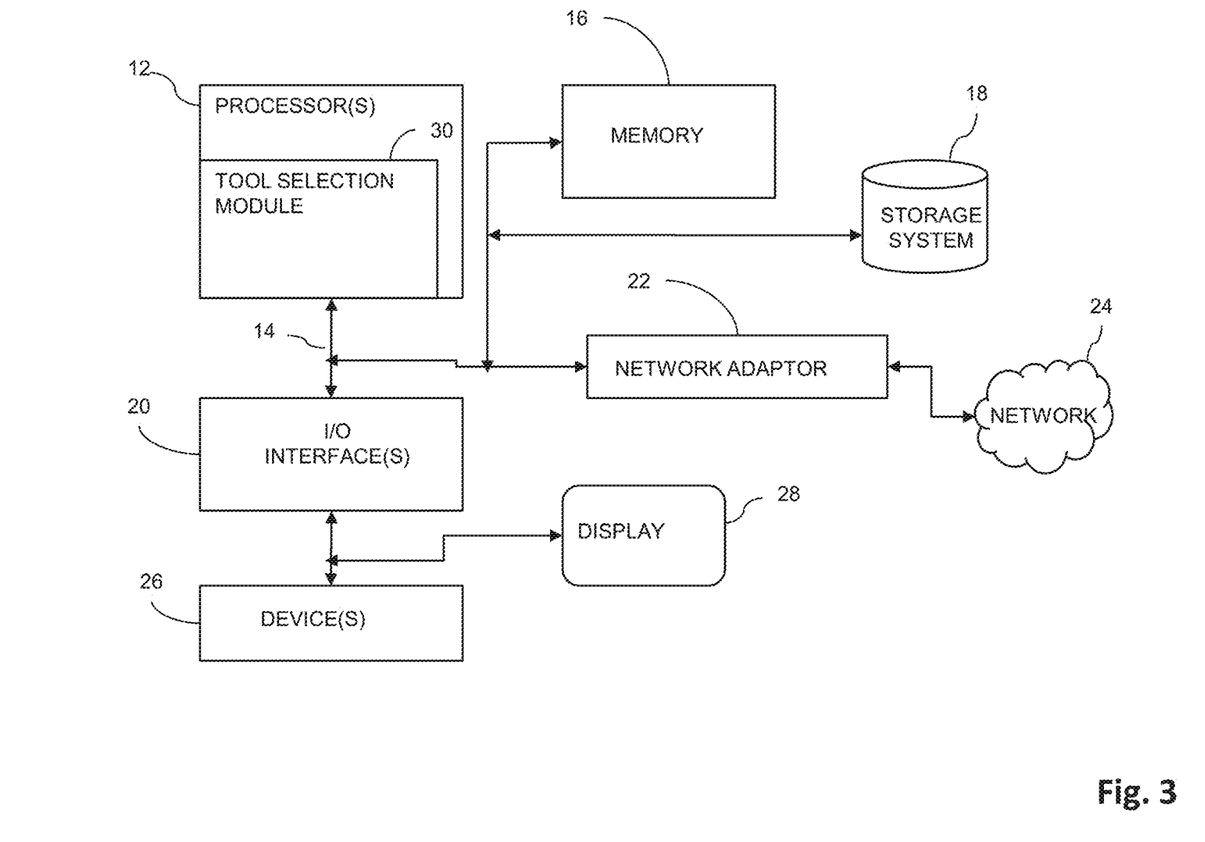
FIG. 3 illustrates a schematic of an example computer or processing system relating to machine learning for technical tool selection in one embodiment.

FIG. 3 illustrates a schematic of an example computer or processing system that may implement machine learning for technical tool selection in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types.

The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., tool selection module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 4:
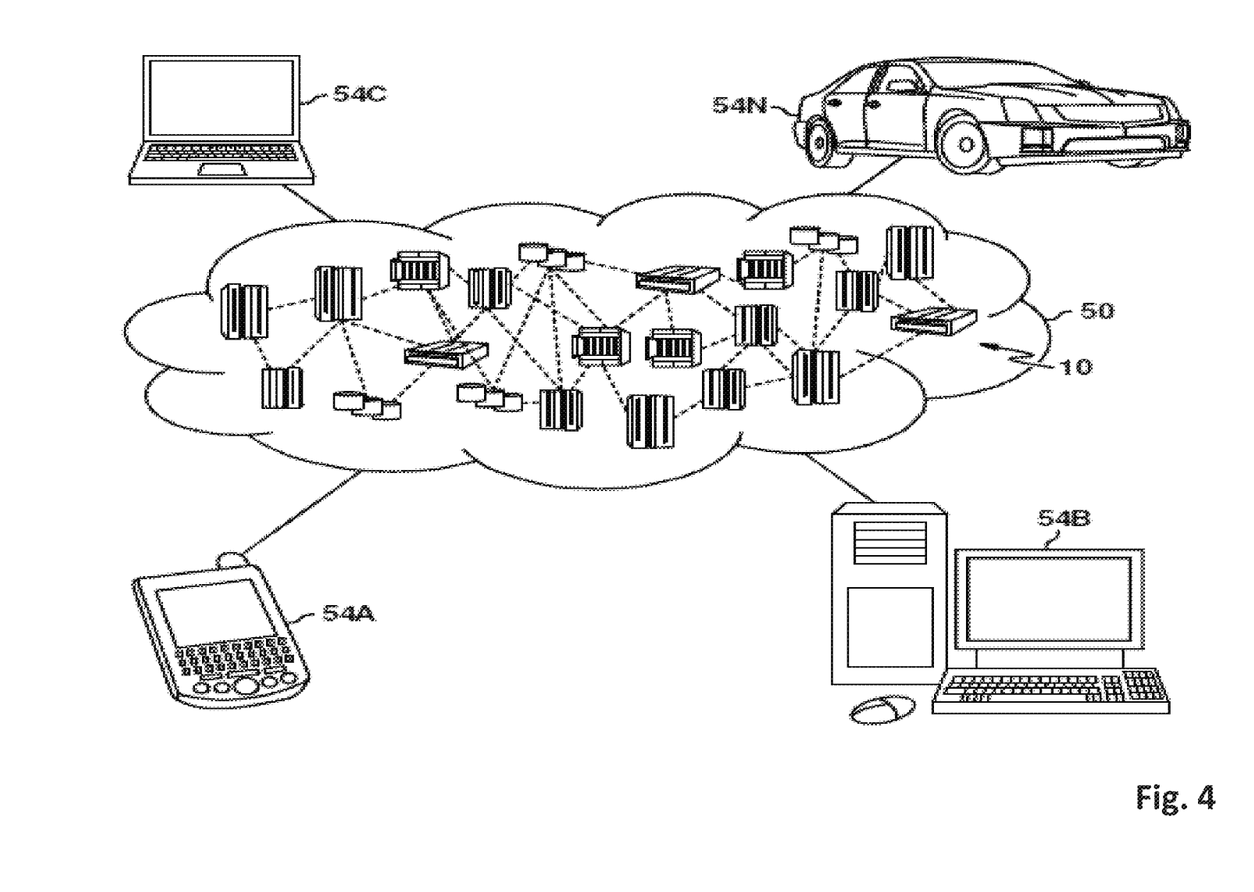
FIG. 4 depicts a cloud computing environment according to an embodiment of the present invention.

FIG. 4 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
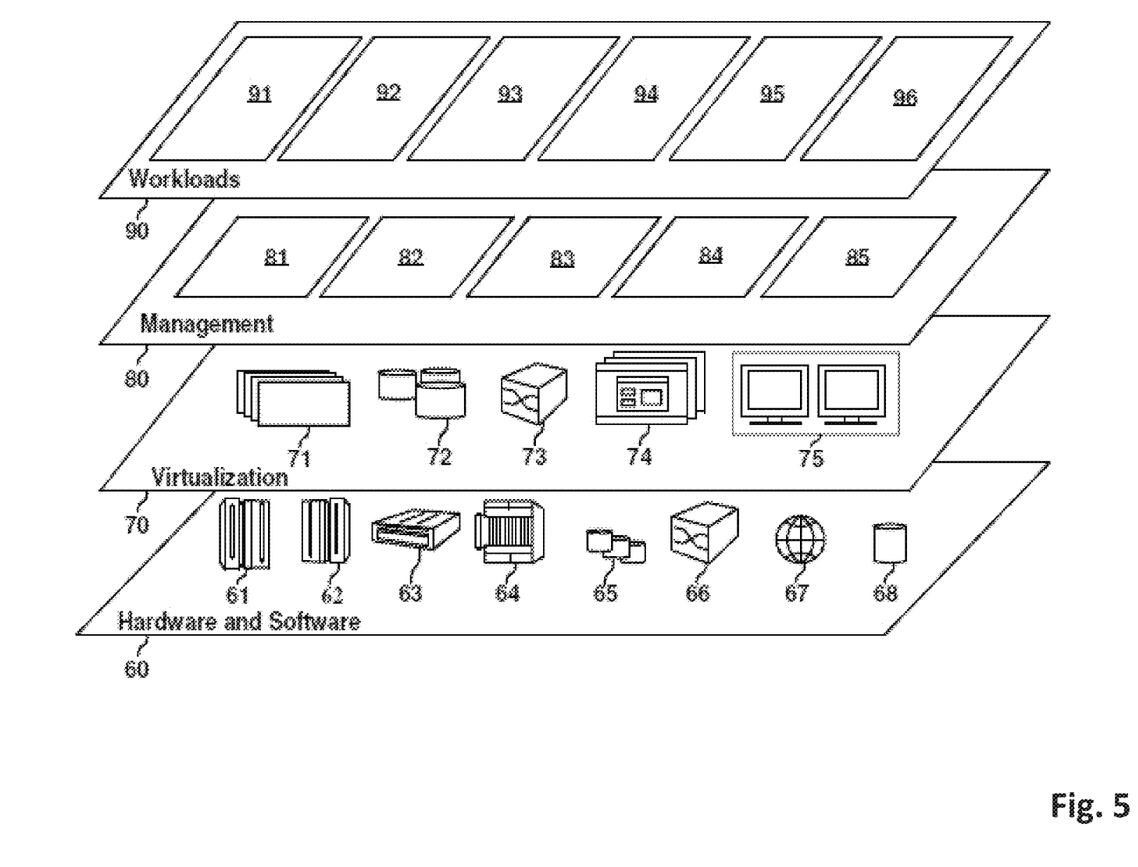
FIG. 5 depicts abstraction model layers according to an embodiment of the present invention.

FIG. 5 depicts abstraction model layers according to an embodiment of the present invention. Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tool selection 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a memory;
a processor configured to be in communication with the memory, and the processor being configured to:
run a machine learning model to generate a set of requirements to implement a project;
identify a keyword from the set of requirements;
search for the keyword on a search engine;
receive a search result from the search engine corresponding to the keyword; and
identify, based on the search result, a tool that can be used to implement the project, wherein the tool is in compliance with the set of requirements.

2. The system of claim 1, wherein the processor is configured to:
deploy an agent to a user device;
receive, from the agent, context data representing a context of the project and the user device;
wherein the processor is configured to run the machine learning model with the context data.

3. The system of claim 2, wherein the context data is desensitized.

4. The system of claim 2, wherein the context data comprises at least one user preference.

5. The system of claim 1, wherein the processor is configured to train the machine learning model using historical data.

6. The system of claim 1, wherein the processor is configured to retrain the machine learning model using at least one of the set of requirements, the keyword, the search result, and the identified tool.

7. The system of claim 1, wherein the processor is configured to execute natural language processing (NLP) techniques on the search result to identify the tool.

8. A computer-implemented method comprising:
running, by a processor, a machine learning model to generate a set of requirements to implement a project;
identifying, by the processor, a keyword from the set of requirements;
searching, by the processor, for the keyword on a search engine;
receiving, by the processor, a search result from the search engine corresponding to the keyword; and
identifying, by the processor, based on the search result, a tool that can be used to implement the project, wherein the tool is in compliance with the set of requirements.

9. The computer-implemented method of claim 8, further comprising:
deploying, by the processor, an agent to a user device;
receiving, by the processor, from the agent, context data representing a context of the project and the user device;
wherein running the machine learning model comprises running, by the processor, the machine learning model with the context data.

10. The computer-implemented method of claim 9, wherein the context data is desensitized.

11. The computer-implemented method of claim 9, wherein the context data comprises at least one user preference.

12. The computer-implemented method of claim 8, further comprising training, by the processor, the machine learning model using historical data.

13. The computer-implemented method of claim 8, further comprising retraining, by the processor, the machine learning model using at least one of the set of requirements, the keyword, the search result, and the identified tool.

14. The computer-implemented method of claim 8, further comprising executing, by the processor, natural language processing (NLP) techniques on the search result to identify the tool.

15. A computer program product for selecting a tool for a project, the computer program product comprising a computer readable storage device medium having program instructions embodied therewith, the program instructions executable by a processor of a device to cause the device to:
run a machine learning model to generate a set of requirements to implement a project;
identify a keyword from the set of requirements;
search for the keyword on a search engine;
receive a search result from the search engine corresponding to the keyword; and
identify, based on the search result, a tool that can be used to implement the project, wherein the tool is in compliance with the set of requirements.

16. The computer program product of claim 15, wherein the program instructions are further executable by the processor of the device to cause the device to:
deploy an agent to a user device;
receive, from the agent, context data representing a context of the project and the user device;
wherein running the machine learning model comprises running, by the processor, the machine learning model with the context data.

17. The computer program product of claim 16, wherein context data is desensitized.

18. The computer program product of claim 15, wherein the program instructions are further executable by the processor of the device to cause the device to train the machine learning model using historical data.

19. The computer program product of claim 15, wherein the program instructions are further executable by the processor of the device to cause the device to retrain the machine learning model using at least one of the set of requirements, the keyword, the search result, and the identified tool.

20. The computer program product of claim 15, wherein the program instructions are further executable by the processor of the device to cause the device to execute natural language processing (NLP) techniques on the search result to identify the tool.

* * * * *